United States Patent
Mishra et al.

(10) Patent No.: US 12,457,056 B1
(45) Date of Patent: Oct. 28, 2025

(54) INTELLIGENT MANAGEMENT OF FORWARD ERROR CORRECTION

(71) Applicant: Cisco Technology, Inc., San Jose, CA (US)

(72) Inventors: Abhinesh Mishra, Karnataka (IN); Shishir Kumar, Karnataka (IN); Ritu Singh, Karnataka (IN); Amjad Inamdar, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/649,250

(22) Filed: Apr. 29, 2024

(51) Int. Cl.
*H04L 1/00* (2006.01)
*H04L 43/0829* (2022.01)

(52) U.S. Cl.
CPC ........ *H04L 1/0042* (2013.01); *H04L 43/0835* (2013.01)

(58) Field of Classification Search
None
See application file for complete search history.

(56) References Cited

U.S. PATENT DOCUMENTS

| | | |
|---|---|---|
| 2015/0063368 A1 | 3/2015 | Sharma et al. |
| 2015/0222555 A1 | 8/2015 | Rickeby et al. |
| 2022/0321261 A1 | 10/2022 | Bajaj et al. |
| 2023/0188444 A1 | 6/2023 | Oyman et al. |

FOREIGN PATENT DOCUMENTS

EP  2882125 A1  6/2015

*Primary Examiner* — Guerrier Merant
(74) *Attorney, Agent, or Firm* — Lee & Hayes, P.C.

(57) ABSTRACT

An intelligent forward error correction (iFEC) method and system are automatically triggered and started for providing forward error correction for applications when packet loss is predicted to be more than a threshold packet loss level during a prescribed interval and the actual packet loss is more than a threshold level. Similarly, the intelligent FEC method and system may be automatically disabled when packet loss is predicted to be less than the threshold level during a prescribed interval. If prescribed bandwidth of a transmission uplink through which application data packets will pass will be slowed or choked by use of iFEC, then iFEC may be disabled or stopped to prevent further congestion in the uplink. That is, according to examples, iFEC is started and stopped based on predicted packet loss and uplink/bandwidth health as opposed to simply operating forward error correction in a "always on" or manually provisioned manner.

20 Claims, 8 Drawing Sheets

INTELLIGENT MANAGEMENT OF FORWARD ERROR CORRECTION

TECHNICAL FIELD

The present disclosure relates generally to forward error correction for recovering lost data packets. More specifically, the techniques and mechanisms relate to automatically configuring critical applications for forward error correction based on predicted packet loss and predicted bandwidth availability.

BACKGROUND

A variety of software applications and associated systems require or utilize data transmission across one or more networks for providing a number of different useful functions. Data transmission between applications operating within computing systems or across networks between computing systems is required in complex computing operations, education systems, business systems, healthcare systems, financial systems, entertainment systems, and the like. For example, a software application operating at a remote site such as a business, hospital, energy production facility, or the like, may process data followed by transmitting resulting data to another application or computing system across a network such as the Internet.

Data transmitted from one application or system to another application or system is typically broken into data packets which are small pieces or fragments of a data transmission. During data transmission, one or more data packets may be lost during transmission across the network. Loss of data packets during data transmission causes a number of problems. For example, in the case of data transmission associated with communications applications or systems, packet loss may create connectivity issues such as disrupted audio, dropped calls, video distortion or jitter, static, and the like. In the case of significant packet loss, the received data may be of no value because a receiving application or system may require all data packets in order to use the received data. That is, some applications or systems may be more critical than other applications or systems such that data packet loss for the more critical applications or systems is not acceptable for operation of the applications or systems. For example, if the application is part of a communications system where data packet loss will prevent the communications system from operating altogether, then that application will be considered critical to the communications system, and data packet loss must be corrected.

To account for anticipated or experienced packet loss, forward error correction (FEC) is utilized. FEC involves sending additional data packets with each transmission that may be used to correct lost data packets during transmission. Unfortunately, such "always on" forward error correction requires consumption of substantial transmission bandwidth and often requires manually configuring all applications requiring FEC. Manually configuring applications requires substantial maintenance and scalability costs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure relates generally to forward error correction for recovering lost data packets. More specifically, the techniques and mechanisms relate to automatically configuring critical applications for forward error correction based on predicted packet loss and predicted bandwidth availability.

A system to perform techniques described herein may include an analytics service operative to classify an application as a critical application for configuration as an FEC-configured application. The analytics service may determine a threshold packet loss at which forward error correction is triggered for the FEC-configured application. The analytics service may also predict a packet loss for the FEC-configured application during a prescribed interval and may predict a bandwidth consumption associated with the FEC-configured application. The system also may include an FEC management component operative to monitor packet loss for the FEC-configured application. The FEC management component is further operative to automatically start forward error correction for the FEC-configured application if a predicted packet loss and actual packet loss for the FEC-configured application is above the threshold packet loss. Forward error correction may be automatically stopped for the FEC-configured application if the actual packet loss for the FEC-configured application is below the threshold packet loss or if available bandwidth is below a threshold bandwidth level. According to examples, the analytics service is further operative to predict a network bandwidth available for the FEC-configured application. The FEC management component is further operative to stop forward error correction for the FEC-configured application after a prescribed interval during which no packet loss occurs or if the predicted network bandwidth is below a threshold network bandwidth.

A method to perform techniques described herein may include classifying an application as an FEC-configured application including classifying the application as a critical application for which forward error correction is required for accounting for packet loss. The method may also include determining a threshold packet loss at which forward error correction is triggered and predicting a packet loss for a FEC-configured application during a prescribed interval. Packet loss for the FEC-configured application may be monitored, and if a predicted packet loss for the FEC-configured application is above the threshold packet loss and actual packet loss for the FEC-configured application is above the threshold packet loss, forward error correction for the FEC-configured application may be automatically started. A network bandwidth available for the FEC-configured application may be predicted, and if the predicted network bandwidth is below a threshold network bandwidth, forward error correction for the FEC-configured application may be automatically stopped.

Additionally, the techniques described herein may be performed by a device having non-transitory computer-readable media storing computer-executable instructions that, when executed by one or more processors, performs the methods described above.

EXAMPLE EMBODIMENTS

As briefly discussed above, forward error correction (FEC) is utilized for correcting data packet loss during transmission of a flow of data packets between software applications and associated systems. For example, if a software application responsible for processing electronic mail transmits data across a network (e.g., the Internet) to a receiving router associated with an intended electronic mail receiving application, the transmission is broken into data packets. As one or more data packets may be lost during transmission, the electronic mail message received at the example electronic mail receiving application may be displayed with missing text or data, or the electronic mail receiving application may be unable to process the received electronic mail item at all depending on the extent of the packet loss. As should be appreciated, this is but one example of the vast number of data transmissions that may be harmed. Forward error correction techniques are utilized to correct packet loss by sending parity packets along with the transmission of other data packets where the parity packets contain information that may be used by a receiving router or other application or system to recover and correct the lost data packets.

According to examples, packet loss in a network may be monitored and recorded by sending bidirectional forwarding protocol (BFD) packets every one (1) second. Packet loss value is calculated for the last 600 BFD packets (i.e., over a 10-minute interval), and if packet loss is detected above a configured loss threshold, FEC may be auto enabled after the prescribed time interval (e.g., 10 minutes). Unfortunately, while such a system allows for automatically enabling FEC, such a system must be manually configured for each application. As applications increase, such manual configurations must be revisited repeatedly. This incurs maintenance costs and scalability costs. In addition, at times, packet loss implies bad health of the uplink. An unhealthy uplink may also experience congestion and enabling FEC, which consumes an additional bandwidth (e.g., 20% more bandwidth), may further choke an already congested uplink.

According to techniques and mechanisms described herein, an intelligent forward error correction (iFEC) method and system works in concert with a manually programmed and activated forward error correction (FEC) system for providing forward error correction of data packet loss during transmission of a data flow. According to examples, iFEC and FEC are utilized based on predicted packet loss, experienced packet loss, threshold packet loss, and available bandwidth. More particularly, as will be described in detail below, according to examples of the present disclosure, iFEC is triggered and may be turned on for a data flow if predicted packet loss during a prescribed time interval (e.g., 10 minutes) is greater than a prescribed packet loss level threshold and if actual packet loss is greater than the prescribed packet loss threshold and the predicted available bandwidth for the data flow is greater than a prescribed minimum available bandwidth threshold. Intelligent forward error correction (iFEC) is not turned on if actual current packet loss is less than the packet loss threshold or if the predicted available bandwidth is less than the minimum available bandwidth threshold. iFEC is turned off if actual packet loss during the last prescribed time interval (e.g., 10 minutes) is less than the packet loss threshold or the predicted available bandwidth is less than the minimum available bandwidth threshold. In addition, manually configured forward error correction (FEC) may be turned on if actual packet loss during the last prescribed time interval (e.g., 10 minutes) is greater than the packet loss threshold. FEC may be turned off if the actual packet loss during the last prescribed time interval is less than the packet loss threshold.

As should be appreciated, threshold packet loss and bandwidth levels may vary according to criticality of a given application as determined by a developer or user of the application. That is, such thresholds may vary according to the need for greater or lesser forward error correction. In addition, as should be appreciated, the example prescribed time interval of 10 minutes is for purposes of illustration only and is not limiting of other prescribed time intervals (e.g., 5 minutes, 15 minutes, etc.) that may be used in accordance with examples of the present disclosure.

According to examples, a network management platform may configure, monitor and troubleshoot one or more networks over which data transmissions may be passed. An analytics service may provide comprehensive insights into application and network performance. According to examples of the present disclosure, the analytics service may monitor and predict packet loss associated with data transmissions for a given application (e.g., an electronic mail application or server). In addition, the analytics service, in association with the network management platform, may monitor and predict bandwidth availability across a given uplink or network and for a given application or service. According to an example, the actions and processing of the analytics service may be performed in association with or at the direction of the network management platform based on its monitoring and troubleshooting of one or more networks across which data packet transmission is passed, as well as its monitoring and troubleshooting of devices, for example, routers use as part of transmission of data packets across a given network.

According to examples, when the intelligent FEC techniques and mechanisms described herein are turned on, all critical applications are automatically configured for FEC. That is, for applications, classified as critical or having a criticality score above a prescribed threshold, manual configuration is not required. As should be appreciated, applications can be configured manually under certain situations, as described herein, but such manual configuration becomes part of the intelligent FEC as opposed to the primary approach to FEC. For applications where FEC is automatically enabled, FEC gets auto triggered when predicted packet loss is more than a prescribed packet loss threshold and when this packet loss is expected to last for more than the prescribed interval (e.g., 10 minutes) and when current value of actual packet loss is more than the threshold. As should be understood, the prescribed interval of FEC analysis (e.g., 10 minutes) can be reduced or increased as per the need. According to one example, selection of prescribed interval (e.g., 10 minutes) as default value is done to keep parity with the analysis interval in which packet loss is observed before enabling or disabling FEC and to dampen any temporary degradation of an observed network's health parameters (packet loss, bandwidth consumption, etc.). Likewise, according to examples, iFEC is automatically disabled/stopped when packet loss is predicted to be lesser than the threshold value for more than the prescribed interval (e.g., 10 minutes) and the current value of actual packet loss is lesser than the threshold value.

According to one example, predicted application and network values are available on an every minute basis. Bandwidth consumption is also accounted for when enabling iFEC for configured applications. If the predicted bandwidth for an uplink is bad, then choking it with additional parity packets of FEC may clog the uplink even further. This added choking of bandwidth may breach a service level agreement (SLA) of some applications, which may be programmed to switch over to a fallback uplink in the case of uplink bandwidth congestion. Every switchover has a penalty in terms of user experience, hence giving network awareness of resource availability (i.e., uplink bandwidth health) helps improve user experience. If a network administrator manually overrides the intelligent FEC configuration, predicted bandwidth availability does not affect operation of FEC. In such cases, FEC stays active even though bandwidth prediction suggests diminished or limited availability of bandwidth. According to one example, if network performance prediction is difficult or not considered accurate, and automatic enablement and starting of FEC in a non-lossy network may incur unnecessary bandwidth cost to enterprises, intelligent FEC may automatically stop after a prescribed interval (e.g., 10 minutes) when no actual packet loss is experienced during the prescribed interval.

Figure 1:
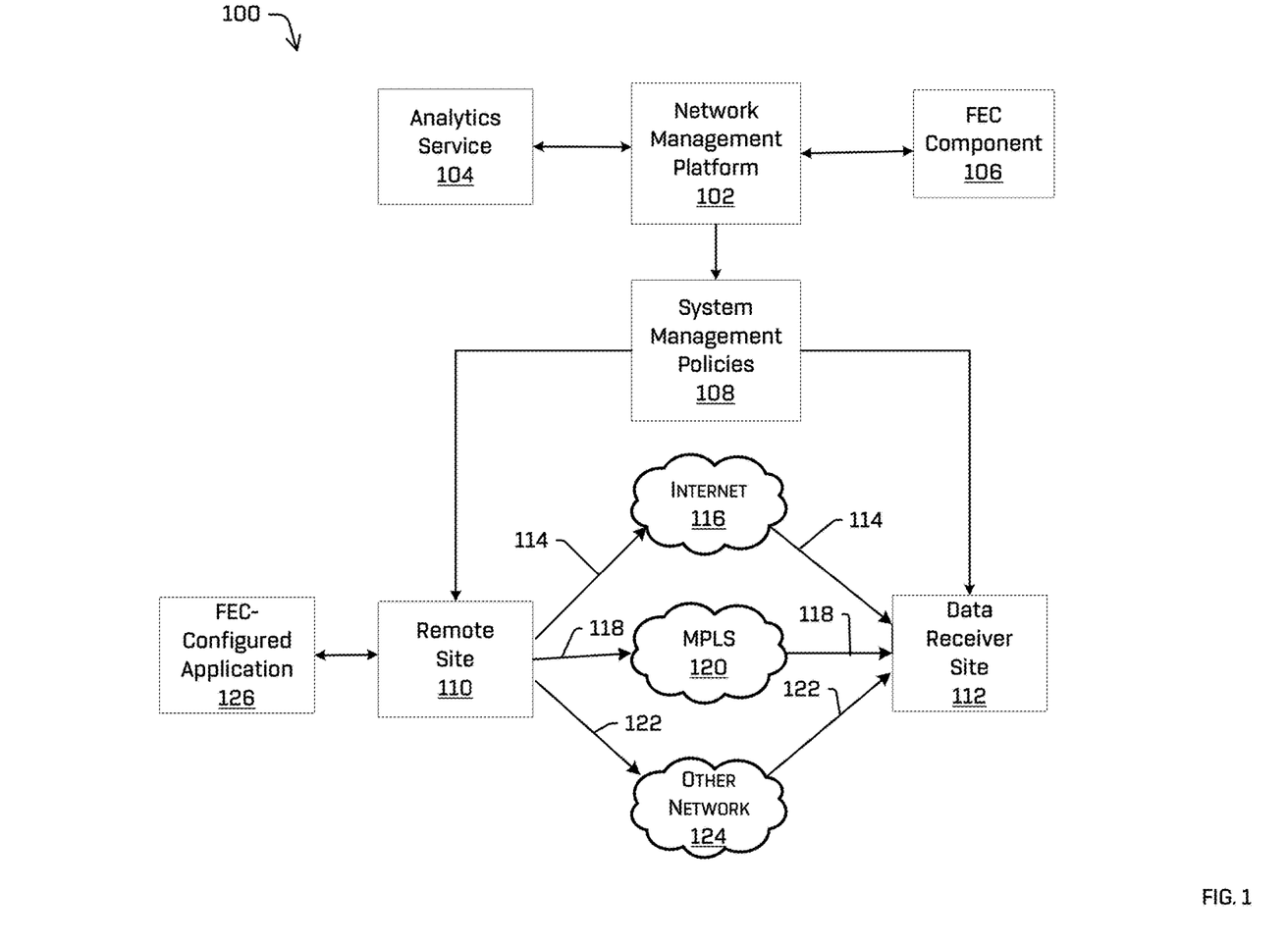
FIG. 1 illustrates a system architecture diagram of an environment in which the criticality of an application is classified and with which data packet loss and network bandwidth are predicted and managed via intelligent forward error correction (iFEC).

FIG. 1 illustrates a system architecture diagram of a system 100 in which the criticality of an application is classified and with which data packet loss and network bandwidth are predicted and managed via intelligent forward error correction (iFEC). The network management platform 102 is illustrative of one or more software applications, computing systems and associated devices responsible for configuring, monitoring and troubleshooting one or more networks and devices used across the one or more networks with which and over which data is transmitted according to examples described herein. The analytics service 104 is illustrative of one or more software applications, computing systems and associated devices responsible for determining and offering comprehensive insights into application performance and network performance. As briefly described above, according to examples, the network management platform 102 and the analytics service 104 are responsible for predicting packet loss for data transmission from a given application or associated device or systems during a prescribed interval and for determining and predicting uplink health and bandwidth availability for transmitting data packets from an application across one or more networks.

According to examples, the network management platform 102 and/or the analytics service 104 may utilize machine learning and artificial intelligence techniques for predicting packet loss and bandwidth/uplink health. According to examples, the network management platform 102 and the analytics service 104 may utilize machine learning and artificial intelligence techniques for classifying applications as critical and for predicting packet loss and uplink/bandwidth health. According to one example, the network management platform 102 and/or the analytics service 104 may employ machine learning/artificial intelligence via one or more known systems such as use of large language models for performing predictive functions. As known by those skilled in the art, large language models (LLM) are trained with vast amounts of text, data and statistical data representing relationships between and among text and data items. Thus, querying such systems allows for generation of predictions associated with a given text or data item.

According to examples of the present disclosure, the network management platform 102 and/or the analytics service 104 may query such a system for predictive information about the criticality of an application or about anticipated packet loss or uplink/bandwidth health. For example, if the machine learning/artificial intelligence system is trained with data associated with historical requirements of acceptable packet loss for a given application, the network management platform 102 and/or the analytics service 104 may use such system training and data to predict that one application is of a high criticality versus another application. For example, if machine learning/artificial intelligence training for a given application shows that historically forward error correction is manually applied to or maintained at all times for a given application and/or that packet loss reporting shows that little to no packet loss is considered acceptable for the given application, such information may be used by the network management platform 102 and/or the analytics service 104 for determining and/or predicting that the given application is a critical application requiring forward error correction when packet loss is predicted or when uplink/bandwidth congestion is predicted. On the other hand, if text or data and statistical information trained for another application indicates that packet loss for data transmission associated with the other application is accepted at high levels, such information may be used by a machine learning/artificial intelligence technique or mechanism for determining and predicting that such an application may be less critical in terms of a need for forward error correction, as described herein.

According to one example, in addition to determining that a particular application is critical based on such analysis, a scale of criticality may be employed by the analytics service 104 where one application may receive a very high score of criticality where historical information associated with the application shows that very little or no packet loss is considered acceptable for the application whereas another application may receive a low criticality score where historical information for the application shows that a high degree of packet loss has been accepted for the application. As should be understood, other applications may lie between high criticality scores and low criticality scores. According to an example, a threshold criticality score may be set above which and associated application is considered critical and below which an application is considered noncritical. As described herein, classifying an application as critical by the analytics service 104 allows for the application to be designated or configured for automatic forward error correction according to the techniques and mechanisms described herein.

Similarly, the analytics service 104 may predict packet loss for a given application during a given time interval by analyzing historical information associated with packet loss experienced by data transmission from the application. For example, if it is known that historically packet loss associated with a given application occurs during a given time interval, for example, during periods of high network usage, such information may be utilized by the analytics service 104 for predicting packet loss for the application based on the time interval in which forward error correction may be needed for the application. Alternatively, if historical information for the application shows that a small degree of packet loss may be anticipated during an upcoming time interval, for example, during a time interval of very low network traffic, then the analytics service 104 may predict low amounts of packet loss for the application during a usage interval in which historical packet loss has not been experienced for the application. According to another example, historical and statistical information for a given application may show varying degrees of packet loss when the application is transmitting data in association with other applications/systems. Such information, like time intervals, may be used for intelligently predicting packet loss depending on the usage circumstances for a given application.

In terms of uplink/bandwidth analysis and prediction, the network management platform 102 and/or analytics service 104 may likewise predict the congestion of an uplink through which data transmission for a given application will be passed based on historical information and based on current network congestion. For example, as described above, by sending bidirectional forwarding protocol (BFD) packets on a periodic basis (e.g., every one second), packet loss may be predicted in association with a given uplink and/or network. A combination of analysis of historical and statistical information associated with data transmission through a given uplink at various time intervals during a day with real-time information received by sending BFD packets through an uplink, the network management platform 102 and/or the analytics service 104 may predict the health of a given uplink through which data may be transmitted from a given application.

Referring still to FIG. 1, the FEC management component 106 is illustrative of one or more software applications and associated devices responsible for directing the intelligent forward error correction actions described herein (e.g., with respect to FIGS. 2-7) for enabling, disabling, starting and stopping forward error correction based on predicted packet loss, actual packet loss and uplink and/or bandwidth health as determined by the network management platform 102 and/or analytics service 104, as described above. According to examples, the FEC component 106, as well as other components or systems illustrated in FIG. 1 may reside on a local computing device 800 (see FIG. 8), or the FEC component 106 may be operated at a remote site 110 or data receiving site 112, describe below, where its functionality may be accessed by one or more local computing devices 800 via a suitable local or distributed (e.g., Internet) network. Alternatively, the FEC component may be operated from a centralized data management location accessible by one or more local computing devices 800 via a suitable local or distributed (e.g., Internet) network.

The system management policies component 108 is illustrative of one or more operating policies that may be determined and implemented for forward error correction by the network management platform 102, the analytics service 104, and the FEC management component 106. For example, if a determination is made that forward error correction is to be initiated for a given application based on predicted packet loss above the threshold packet loss level over the next ten (10) minutes, then a policy directing that action may be stored at the system management policies component 108 for passing to a remote site 110 for directing forward error correction for the given application operating out of the remote site 110. The FEC-configured application 126 is illustrative of any software application for which intelligent FEC has been configured, as described herein when data transmission from the FEC-configured application 126 is transmitted across one or more networks to a receiving application or device.

The network management platform 102, analytics service 104, FEC management component 106, and the system management policies component 108 are illustrated in FIG. 1 as separate systems or components. As should be appreciated, the systems or components 102, 104, 106, 108 may operate separately, or the systems or components may operate as part of a single collection of systems or components housed together at a single computing system or service (e.g., data center) from which intelligent forward error correction as described herein may be managed.

Referring still to FIG. 1, the remote site 110 is illustrative of a software application, computing system, server, or the like at which an FEC-configured application 126 requiring forward error correction services may operate. For example, the remote site 110 may be a personal computer from which an application (e.g., an electronic mail application) operates and from which data packets comprising a data transmission from the example personal computer may be sent. For another example, the remote site 110 may include a number of systems (computers, servers, data storage systems, etc.) associated with an enterprise from which one or more applications requiring forward error correction according to examples of the present disclosure may operate. The data receiver site 112 is illustrative of a software application, computing system, server, or the like at which a data transmission from the remote site 110 may be received. For example, the data receiving site 112 may be an intermediate data center or device (e.g., a router) through which data is passed in route to one or more terminating sites, or the data receiver site 112 may include a terminating device such as a personal computer at which an application (e.g., and electronic mail application) is operated and to which a data transmission receiving forward error correction, as described herein, may be directed.

The networks 116 (e.g., Internet), 120 (e.g., a multiprotocol label switching (MPLS)-based supported network), or other network 124 (e.g., a 4G long-term evolution (LTE)-based network) are illustrative of one or more networks through which data transmissions (i.e., data packet flows) may be passed from the remote site 110 to the data receiver site 112, as described herein. The paths 114, 118, 122 are illustrative of wired or wireless paths through which data transmissions are passed through the networks 116, 120, 124.

Figure 2:
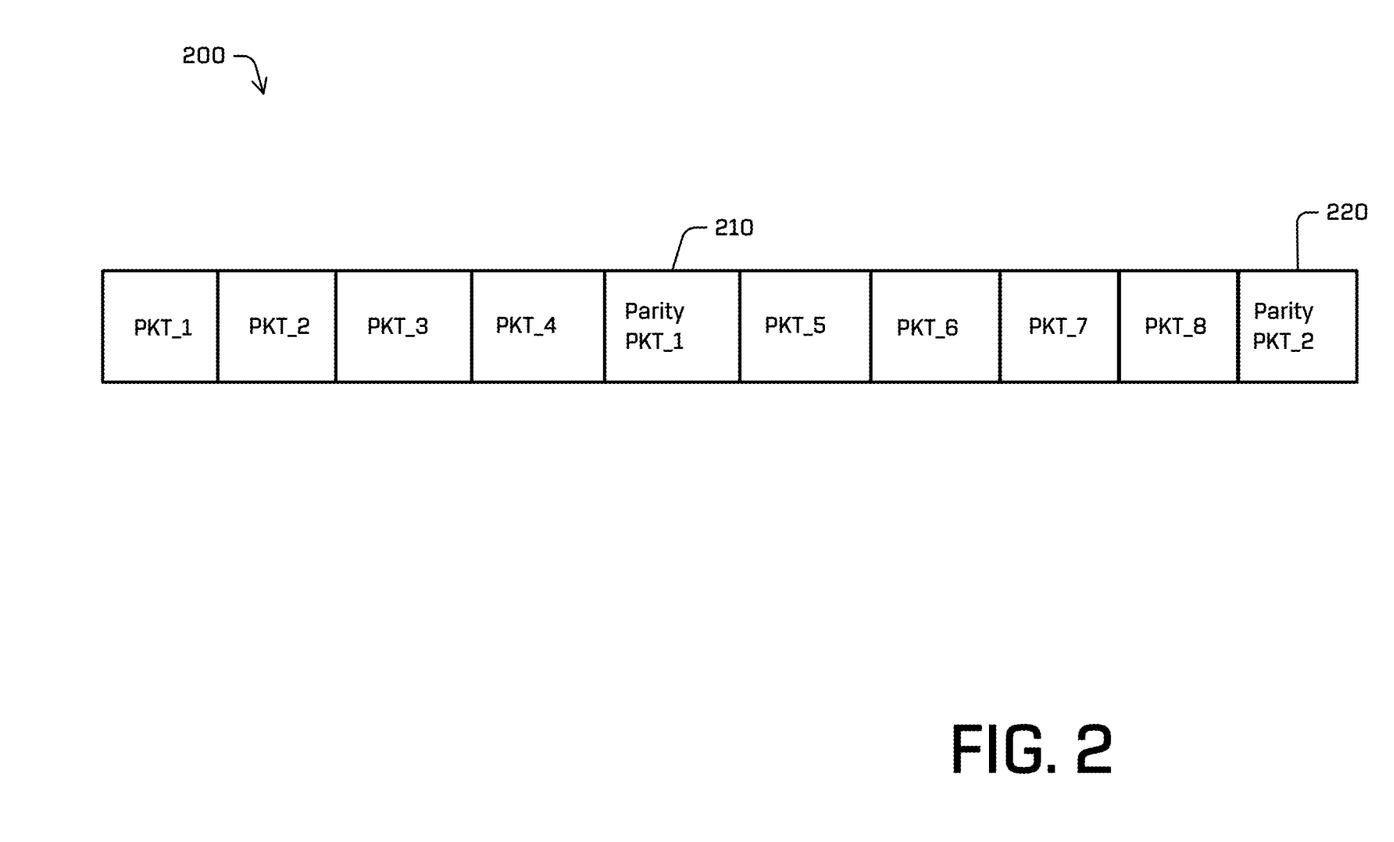
FIG. 2 illustrates a flow of data packets showing parity packets added to the flow of data packets for providing forward error correction.

FIG. 2 illustrates a flow of data packets showing parity packets added to the flow of data packets for providing forward error correction. The data packet flow 200 illustrated in FIG. 2 is illustrative of a set of data packets 1-8 where each data packet 1-8 represents a portion or fragment of a data transmission sent from a remote site 110 to a data receiver site 112, as described above with reference to FIG. 1. According to examples, the data packet flow 200 is broken into individual data packets 1-8 and each individual data packet is transmitted across a network 116, 120, 124 via a path 114, 118, 122 to a data receiver site 112 where the data packets are reassembled into a single data transmission that may be processed by an application at the data receiver site 112. According to examples, if forward error correction is turned on for the data transmission 200, a parity packet 210, 220 may be included at various points in the data packet flow 200 for providing forward error correction for lost data packets preceding the parity packets 210, 220. In the example data packet flow 200, the parity packets 210, 220 are included after four (4) data packets 1-4 and 5-8, respectively. According to examples, the parity packets 210, 220 are Exclusive Or (XOR) logical operators enabling or containing information necessary for reconstructing a lost data packet preceding the parity packets. For example, the parity packet 210 is an XOR of data packets 1-4. Following this example, the parity packet 210 is used to reconstruct any one of the preceding packets 1-4 lost during transmission of the data packet flow 200. For example, if data packet four (4) is lost during transmission, then the parity packet 210 is used to reconstruct the data packet for when the data packet flow 200 is received at the data receiver site 112 (FIG. 1). The parity packet 220 similarly is an XOR for packets 5-8 and may be used to reconstruct one or more of packets 5-8 lost during transmission.

As illustrated in FIG. 2, the parity packets 210, 220 are included after four preceding data packets which means the four preceding data packets plus the parity packet equals five total packets. Thus, inclusion of the parity packets 210, 220 consumes an extra twenty percent (20%) of available bandwidth for each for packets plus parity packet grouping. As should be appreciated, the data packet flow 200 is but one example of a data packet flow and is not limiting of other data packet flow configurations. For example, a typical data flow 200 may contain thousands or millions of data packets and parity packets may be positioned at different locations (e.g., every 5 packets, every 10 packets, and the like).

Figure 3:
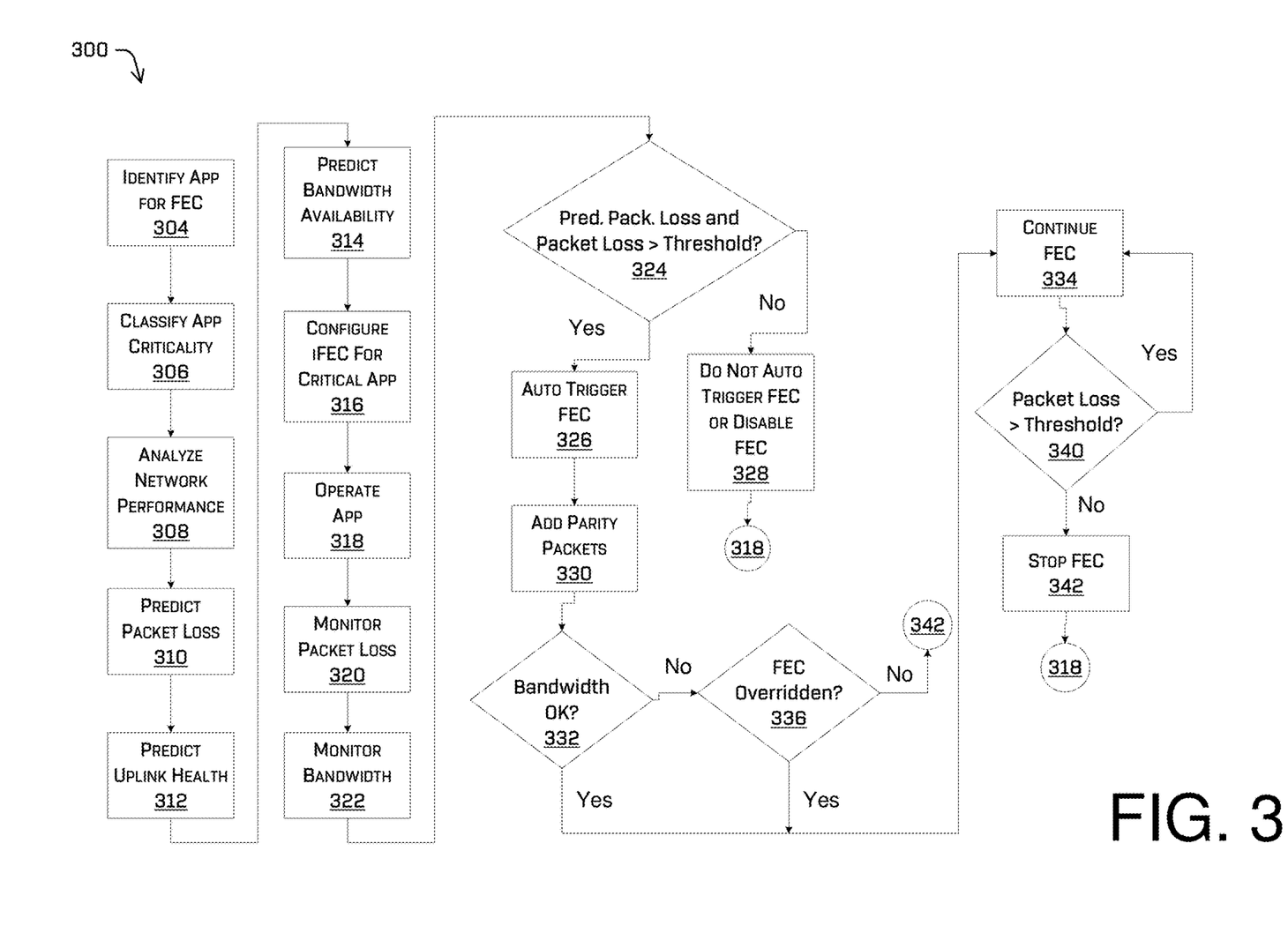
FIG. 3 illustrates a flow diagram of an example method for classifying the criticality of an application and for predicting data packet loss and network bandwidth as part of intelligently managing data transmission via forward error correction.

FIG. 3 illustrates a flow diagram of an example method for classifying the criticality of an application and for predicting data packet loss and network bandwidth as part of intelligently managing data transmission via forward error correction. The method 300 begins at step 304 where an application is identified for potential use of intelligent forward error correction techniques and mechanisms described herein. The application identified for potential use of forward error correction may include any number of applications being of varying criticality in terms of a need for forward error correction. For example, one application may be used for entertainment purposes and a degree of packet loss may not be critical as the packet loss may result in undetectable jitter or a slight amount of audio static at a point of operation that, while important, may not require forward error correction. On the other hand, an application may be used as part of a computing system communication process where packet loss may create problems such as dropped calls, messages, mail failures, and the like in a manner that may disrupt operation of the communication system.

As described above, the analytics service 104 may utilize machine learning and artificial intelligence to generate insights into an application and network performance. For example, based on historical performance issues for the identified application, the analytics service 104 may determine a high criticality for a given application or that the given application has a criticality score above a prescribed criticality score, as described above. Accordingly, at step 306, if the analytics service 104 classifies the identified application as critical, the application is designated as FEC-configured, and the method 300 proceeds to step 308.

At operation 308, the analytics service 104 analyzes a network 116, 120, 124 over which data from the identified application will be passed. As described above with reference to FIG. 1, in addition to classifying the criticality of an application, the analytics service 104 is operative to provide insights into the performance of networks for detecting a need for forward error correction to address packet loss during data transmission. Providing insights into application network performance allows the analytics service 104 to predict packet loss and to predict uplink health and bandwidth availability.

At operation 310, the analytics service 104 predicts packet loss for the identified application over a prescribed interval (e.g., 10 minutes). As described above, the network management system 102 and/or the analytics service 104 may predict packet loss for the identified application based on a number of factors utilizing machine learning/artificial intelligence.

At operation 312, the network management system 102 and/or the analytics service 104 analyze the health of an uplink path 114, 118, 122 that will be used for transmitting data from the FEC-configured application 126 via a given network 116, 120, 124 from the remote site 110 to the data receiver site 112.

At operation 314, the network management system 102 and/or the analytics service 104 analyzes the available bandwidth for the uplink path 114, 118, 122 that will be used for transmitting data. After prediction of packet loss and analysis of uplink health and bandwidth data availability, the network management system 102 and/or the analytics service 104 pass the results of the analysis to the network management platform 102 which, in turn, instructs the FEC management component 106 as to whether intelligent forward error correction is to be enabled for the FEC-configured application 126 where the determined criticality or criticality score for the FEC-configured application 126 calls for enablement and potential triggering of forward error correction for the identified application. According to examples, policies or rules governing how FEC will be operated for the FEC-configured application 126 may be stored at the system management policies component 108, as described above.

At operation 316, intelligent forward error correction is configured and enabled for the identified application if the application is classified as critical or if the application receives a criticality score above the threshold score, as described above. At operation 318, the FEC-configured application 126 is operated at the remote site 110. If operation of the application involves transmission of data to the data receiver site 112 via one of the paths 114, 118, 122 and via one of the networks 116, 120, 124, the transmission of data is broken into data packets, and transmission of the data packets may begin.

At operation 320, the FEC component 106 monitors packet loss for the FEC-configured application. At operation 322, the FEC component 106 or the analytics service 104 monitors bandwidth status of the uplink path 114, 118, 122 through which data transmission is passed to the data receiver site 112.

At operation 324, the FEC component 106 determines whether the predicted packet loss is above a threshold packet loss. As described above for the analytics service 104, for different applications, different levels of packet loss may be acceptable depending on the criticality of different applications. Thus, a threshold packet loss level may be set for different applications, above which packet loss is considered unacceptable and below which packet loss is considered acceptable. For example, in some cases, a packet loss threshold may be 0.1% or less. In other cases, a packet loss of 10% may be considered acceptable. That is, the determination of a packet loss threshold may vary. These examples are for purposes of illustration only and are not limiting of any number of packet loss thresholds that may be set according to examples of the present disclosure. If both the predicted packet loss and the actual packet loss are above the threshold packet loss level, the method 300 proceeds along the "YES" branch to operation 326.

At operation 326, forward error correction for the FEC-configured application is automatically triggered and started. Referring back to operation 324, if either the predicted packet loss or the actual packet loss is below the threshold packet loss level, the method 300 proceeds along the quote "NO" branch to operation 328 where automatic initiation of FEC is not started. If FEC is already in progress, then FEC is disabled, and the method 300 proceeds back to operation 318, and the FEC-configured application continues to operate without forward error correction running for the application.

At operation 330, the FEC component 106 begins adding FEC parity packets to 210, 220 to the data packet flow 200 for the FEC-configured application 126, as illustrated in FIG. 2. As described above with reference to FIG. 2, parity packets will continue to be added to the data packet flow 200 at operation 330 until a determination is made to stop FEC for the FEC-configured application, as described herein.

At operation 332, the analytics service 104 determines whether the bandwidth for the uplink through which data transmission for the FEC-configured application is below a threshold network bandwidth, as described above with reference to FIG. 1. If the bandwidth level is above the threshold level, the method 300 proceeds along the quote "YES" branch to operation 334, and forward error correction for the FEC-configured application continues. If the bandwidth level is below the threshold level, the method 300 proceeds along the "NO" branch to operation 336.

At operation 336, the FEC component 106 determines whether forward error correction has been manually overridden by a network administrator. If FEC has been overridden, the method 300 proceeds along the "YES" branch to operation 334, and FEC for the FEC-configured application continues. If FEC for the FEC-configured application has not been overridden, the method 300 proceeds along the "NO" branch to operation 338, and FEC for the FEC-configuration is stopped. The method 300 and proceeds back to operation 318, and the application operates without forward error correction.

Referring back to operation 334, the method 300 proceeds to operation 340. At operation 340, the FEC component 106 determines whether actual packet loss is above the threshold packet loss level. If so, the method follows the quote "YES" branch back to operation 334, and FEC continues. If at operation 334 actual packet loss is below the threshold packet loss level, the method 300 follows the "NO" branch to operation 342, and FEC is stopped. The method 300 then proceeds back to operation 318, and the application operates without forward error correction.

Figure 4:
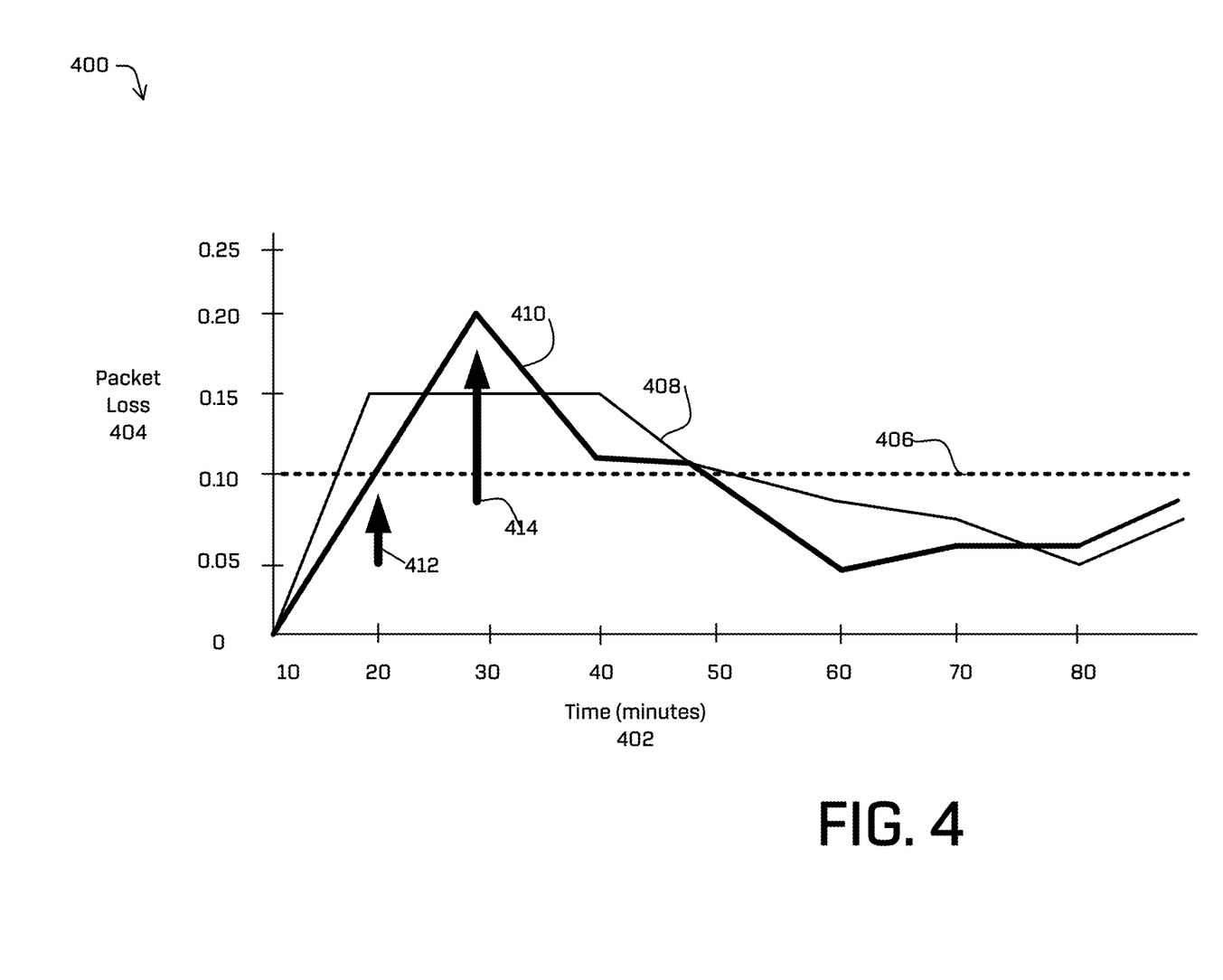
FIG. 4 illustrates a graphical representation of one example operation of intelligent forward error correction.
Figure 5:
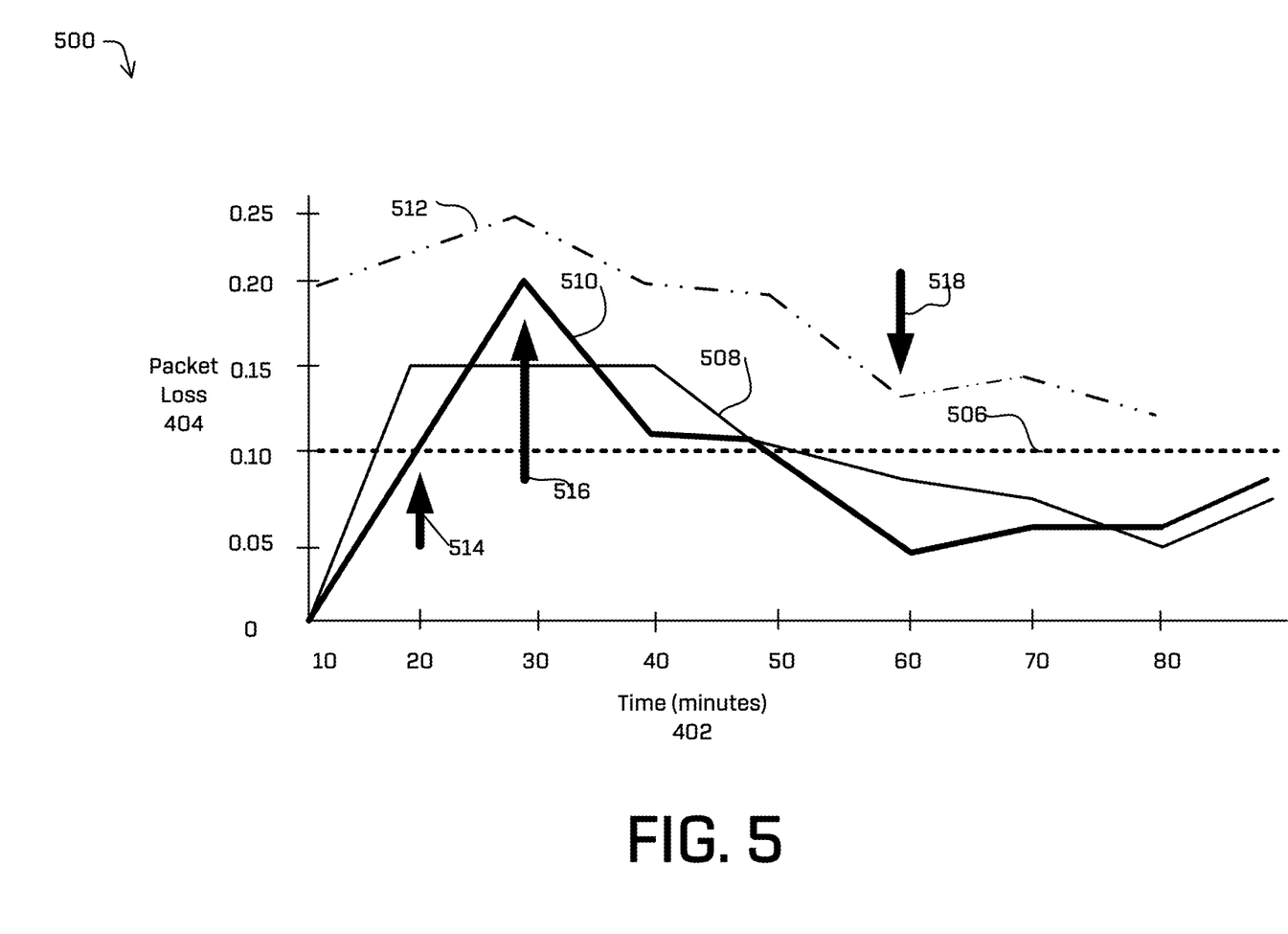
FIG. 5 illustrates a graphical representation of another example operation of intelligent forward error correction.

FIGS. 4 and 5 illustrate graphical representations of example operations of the system 100, illustrated in FIG. 1.

As described above, according to techniques and mechanisms described herein, and intelligent forward error correction (iFEC) method and system works in concert with a manually programmed and activated forward error correction (FEC) system for providing forward error correction of data packet loss during transmission of a data flow. According to examples, iFEC and FEC are utilized based on predicted packet loss, experienced packet loss, threshold packet loss, and available bandwidth. More particularly, as will be described in detail below, according to examples of the present disclosure, iFEC is triggered and may be turned on for a data flow if predicted packet loss during a prescribed time interval (e.g., 10 minutes) is greater than a prescribed packet loss level threshold and if actual packet loss is greater than the prescribed packet loss threshold and the predicted available bandwidth for the data flow is greater than a prescribed minimum available bandwidth threshold. Intelligent forward error correction (iFEC) is not turned on if actual current packet loss is less than the packet loss threshold or if the predicted available bandwidth is less than the minimum available bandwidth threshold. iFEC is turned off if actual packet loss during the last prescribed time interval (e.g., 10 minutes) is less than the packet loss threshold or the predicted available bandwidth is less than the minimum available bandwidth threshold. In addition, manually configured forward error correction (FEC) may be turned on if actual packet loss during the last prescribed time interval (e.g., 10 minutes) is greater than the packet loss threshold. FEC may be turned off if the actual packet loss during the last prescribed time interval is less than the packet loss threshold. As should be appreciated, the examples illustrated in FIGS. 4 and 5 are for purposes of example only and are not limiting of the many other operations of the system 100, illustrated in FIG. 1.

FIG. 4 illustrates a graphical representation of one example operation of intelligent forward error correction. As illustrated in FIG. 4, the X-axis 402 of the graph 400 represents time in minutes, and the Y-axis 404 represents packet loss values. The dotted line 406 represents a threshold packet loss value for an example FEC-configured application 126. The line 408 represents predicted packet loss over time, and the line 410 represents actual packet loss. According to the example illustrated in FIG. 4, at time position 412 after twenty (20) minutes of operation, actual packet loss 410 is greater than threshold packet loss, and the predicted packet loss is above the threshold packet loss. If predicted bandwidth is greater than a minimum threshold bandwidth (which is true for the example illustrated in FIG. 4), iFEC for the FEC-configured application is automatically started. At time position 414, actual packet loss is above the threshold packet loss 406 and exceeds the predicted packet loss 408. According to examples, under this situation, iFEC for the FEC-configured application will continue as long as predicted bandwidth is greater than a minimum threshold bandwidth.

FIG. 5 illustrates a graphical representation of another example operation of intelligent forward error correction. As illustrated in FIG. 5, the X-axis 402 of the graph 500 represents time in minutes, and the Y-axis 404 represents packet loss values. The dotted line 506 represents a threshold packet loss value for an example FEC-configured application 126. The line 508 represents predicted packet loss over time, and the line 510 represents actual packet loss. The dotted/dashed line 512 represents bandwidth consumption. According to the example illustrated in FIG. 5, at time position 514 after twenty (20) minutes of operation, actual packet loss and the predicted packet loss both exceed or are above the threshold packet loss, but bandwidth consumption is very high. Thus, even though FEC would be automatically started based on actual and predicted packet loss, FEC is not automatically started because of unhealthy bandwidth consumption at time position 514 because addition of parity packets 210, 220 would only additionally slow or choke the uplink in use. However, at time position 516, actual packet loss is above the threshold packet loss 506, but also exceeds the predicted packet loss 508. According to examples, under this situation, if FEC has been manually programmed to begin if the actual packet loss exceeds the threshold packet loss level, then FEC may be started. Referring to time position 518 after 60 minutes of operation, both actual packet loss and predicted packet loss drop below the threshold level 506, and manually programmed FEC stops.

According to another example, if the network predictions are not considered accurate where the predicted packet loss and bandwidth consumption do not align with actual packet loss and/or bandwidth consumption and the actual packet loss is less than the threshold packet loss while predicted loss is higher, FEC may not be automatically started as long as actual packet loss does not exceed the threshold packet loss level. According to another example, if network predictions are not considered accurate and the actual packet loss temporarily exceeds the packet loss threshold while predicted loss is more than the threshold value, automatic FEC may be stopped if no actual packet loss is observed for the next observed time interval (e.g., 10-minutes). According to another example, if network predictions are not considered accurate and the actual packet loss is more than the threshold packet loss while predicted loss is lesser, automatic FEC may not be started, but manually programmed FEC may be started, if FEC has been programmed to start under this situation. According to yet another example, if network predictions are not considered accurate and the predicted packet loss is more than the threshold value while the actual packet loss moves above and below the threshold value in an inconsistent manner, FEC may be automatically started (i.e., iFEC) for critical applications. If the actual packet loss becomes lower than the threshold value and continues to be lower than the threshold value for more than a prescribed time interval (e.g., 10 minutes), then automatic FEC (iFEC) may be stopped (i.e., disabled).

Figure 6:
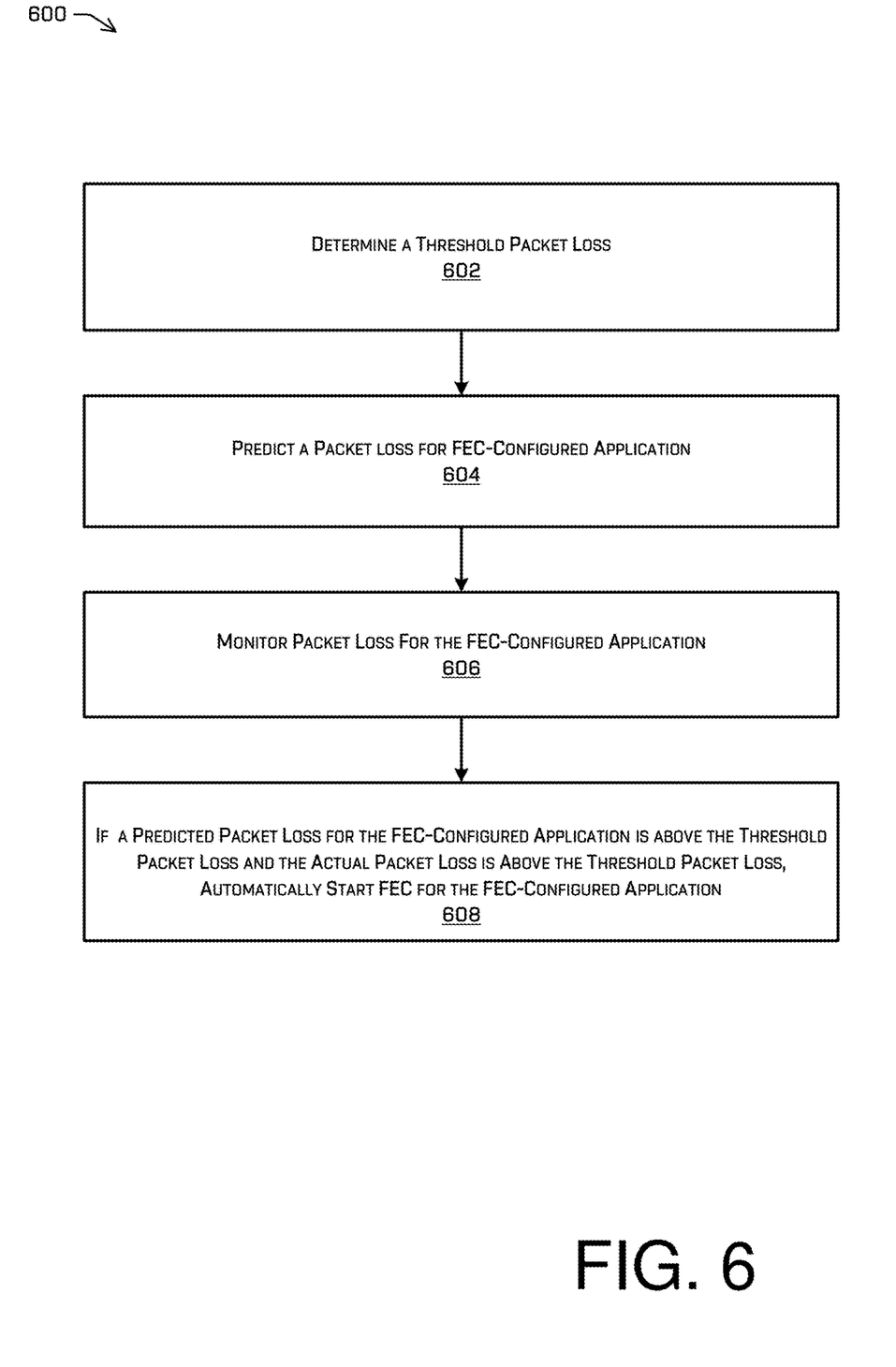
FIG. 6 illustrates a flow diagram of an example method of intelligent forward error correction based on predicted packet loss.

FIG. 6 illustrates a flow diagram of an example method of intelligent forward error correction based on predicted packet loss.

The method 600 begins at operation 602.

At operation 602, a threshold packet loss is determined. According to examples, the threshold packet loss may vary depending on the criticality of the application and associated networks through which data flows. For example, in some cases, a packet loss threshold may be 0.1% or less. In other cases, a packet loss of 10% may be considered acceptable. That is, the determination of a packet loss threshold at operation 602 may vary. These examples are for purposes of illustration only and are not limiting of any number of packet loss thresholds that may be set according to examples of the present disclosure.

At operation 604, packet loss for an FEC-configured application is predicted during a prescribed period of time or time interval (e.g., 10 minutes).

At operation 606, actual packet loss for the FEC-configured application is monitored. As described above, monitoring of actual packet loss for the FEC-configured application may be performed by the analytics service 104 or the FEC management component 106.

At operation 608, if a predicted packet loss for the FEC-configured application is above the threshold packet loss and actual packet loss for the FEC-configured application is above the threshold packet loss, forward error correction (FEC) is automatically started for the FEC-configured application. In addition, according to some examples, as changes in the levels of actual packet loss versus predicted packet loss and threshold packet loss occur at which forward error correction is triggered, automatically triggered FEC may be stopped or started, as described above, as described herein.

The method 600 ends after operation 608.

Figure 7:
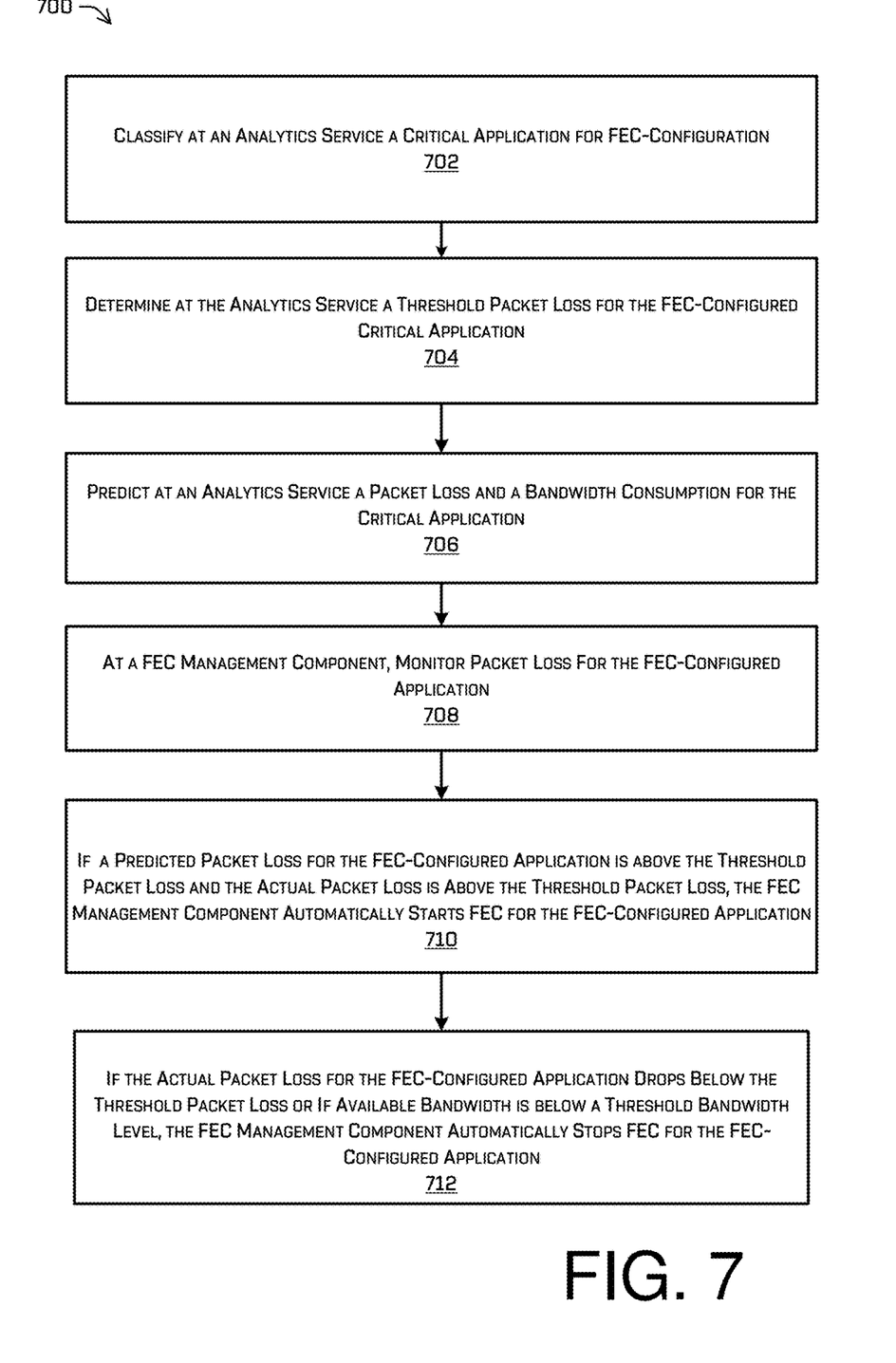
FIG. 7 illustrates a flow diagram of an example method of intelligent forward error correction based on predicted packet loss and bandwidth availability.

FIG. 7 illustrates a flow diagram of an example method of intelligent forward error correction based on predicted packet loss and bandwidth availability.

The method 700 begins at operation 702 where the analytics service 104 determines whether an application is a critical application requiring FEC-configuration.

At operation 704, the analytics service 104 determines a threshold packet loss for the FEC-configured critical application.

At operation 706, the analytics service 104 predicts packet loss and bandwidth consumption for the FEC-configured critical application.

At operation 708, the FEC management component 106 monitors packet loss for the FEC-configured critical application.

At operation 710, if a predicted packet loss for the FEC-configured critical application is above the threshold packet loss, and the actual packet loss is above the threshold packet loss, the FEC management component 106 automatically starts forward error correction for the FEC-configured critical application.

At operation 712, if an actual packet loss for the FEC-configured critical application is below the threshold packet loss, or if available bandwidth is below a threshold bandwidth level, the FEC management component 106 automatically stops forward error correction for the FEC-configured critical application. The method 700 ends after operation 712.

Figure 8:
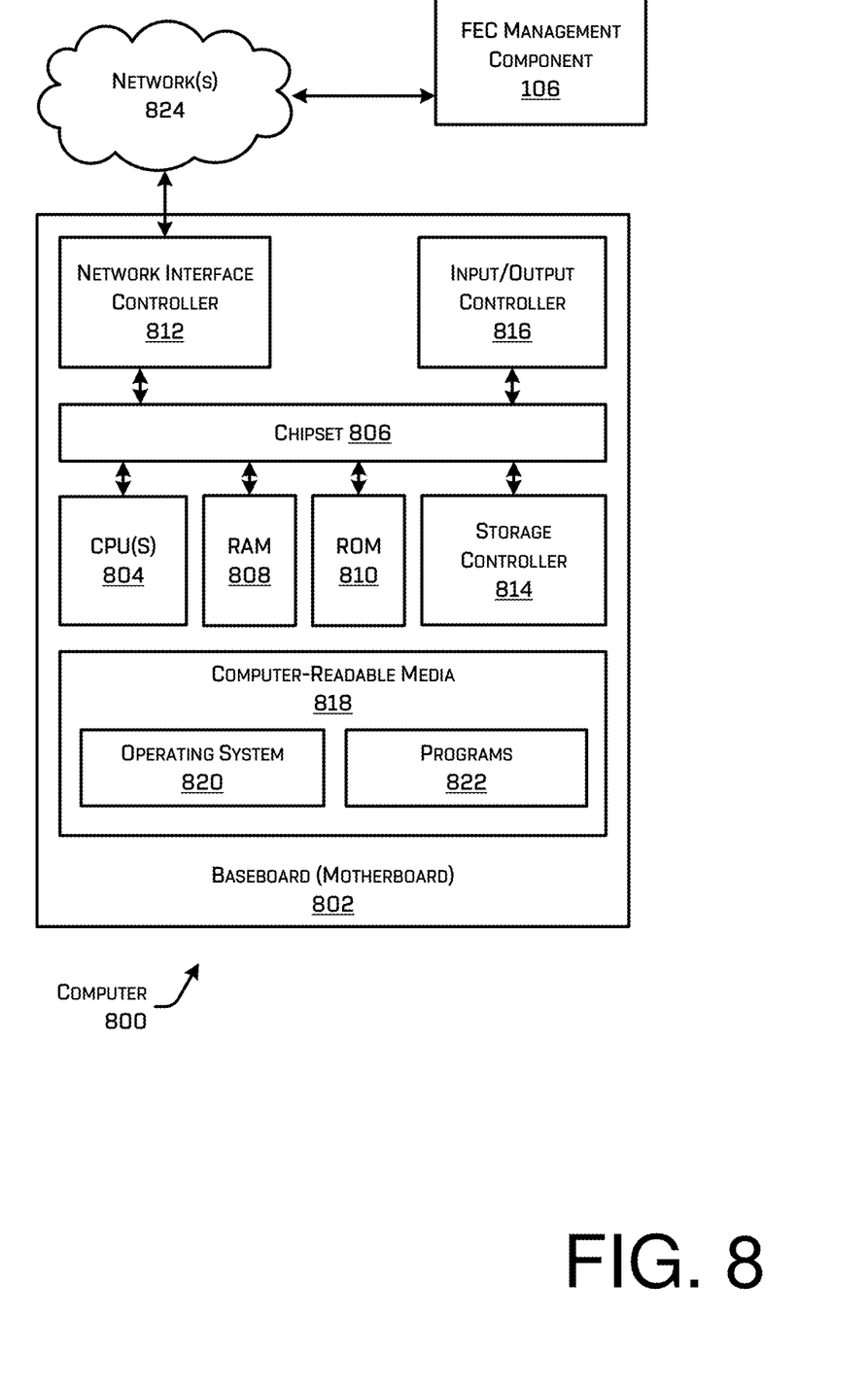
FIG. 8 is a computer architecture diagram showing an illustrative computer hardware architecture for implementing a computing system/device that can be utilized to implement aspects of the various technologies presented herein.

FIG. 8 is a computer architecture diagram showing an illustrative computer hardware architecture for implementing a computing system/device that can be utilized to implement aspects of the various technologies presented herein. The computer architecture shown in FIG. 8 illustrates any type of computer 800, such as a conventional server computer, workstation, desktop computer, laptop, tablet, network appliance, e-reader, smartphone, or other computing device, and can be utilized to execute any of the software components presented herein. The computer may, in some examples, correspond to components of the network management platform 102, the analytics service 104, the FEC management component 104, the remote site 110 and/or the data receiver site 112 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to start up the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 824. The chipset 806 can include functionality for providing network connectivity through a NIC 812, such as a gigabit Ethernet adapter. The NIC 812 is capable of connecting the computer 800 to other computing devices over the network 824. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program components, data structures, or other data. It should be appreciated by those skilled in the art that computer-readable storage media is any available media that provides for the non-transitory storage of data and that can be accessed by the computer 800. In some examples, the operations performed by the network management platform 102, the analytics service 104, the FEC management component 104, the remote site 110 and/or the data receiver site 112, and or any components included therein, may be supported by one or more devices similar to computer 800. Stated otherwise, some or all of the operations performed by the network management platform 102, the analytics service 104, the FEC management component 104, the remote site 110 and/or the data receiver site 112, and or any components included therein, may be performed by one or more computer devices 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 3-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of the network management platforms 102, the analytics service 104, the FEC management component 104, the remote site 110 and/or the data receiver site 112, and/or any other device. The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices, such as the communications described herein as being performed by the client device 144 or the dynamic search system 100. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for selectively encrypting the unencrypted portions of packets for transmission through an encrypted tunnel where the packets are at least partially encrypted. For instance, the programs 822 may cause the computer 800 to perform techniques for communicating determining that portions of the packets are already encrypted, identifying portions of the packets that are unencrypted, and selectively encrypting the portions of the packets that are unencrypted prior to transmission through the encrypted tunnel. In this way, potentially private or sensitive data in the packets that is unencrypted, such as information in the packet headers, will be encrypted using the encryption protocol of the encrypted tunnel, but the data of the packets that is already encrypted, such as the payload, may avoid unnecessary double encryption. By reducing (or eliminating) the amount of data in data packets that is double encrypted, the amount of time taken by computing devices, and computing resources consumed, to encrypted traffic for encrypted tunnels may be reduced. Additionally, the programs 822 may comprise instructions that cause the computer 800 to perform the specific techniques for receiving packets through the encrypted tunnel and decrypting portions of the packets using different encryption protocols.

While the invention is described with respect to the specific examples, it is to be understood that the scope of the invention is not limited to these specific examples. Since other modifications and changes varied to fit operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining a threshold packet loss at which forward error correction is triggered;
   predicting a packet loss for a FEC-configured application during a prescribed interval;
   monitoring a packet loss for the FEC-configured application; and
   in response to determining a predicted packet loss for the FEC-configured application is above the threshold packet loss and actual packet loss for the FEC-configured application is above the threshold packet loss, automatically starting forward error correction for the FEC-configured application.

2. The method of claim 1, wherein
   in response to determining the actual packet loss for the FEC-configured application is below the threshold packet loss while the predicted packet loss is above the threshold packet loss, stopping forward error correction for the FEC-configured application after a prescribed interval during which actual packet loss for the FEC-configured application is below the threshold packet loss.

3. The method of claim 1, wherein
   in response to determining the predicted packet loss for the FEC-configured application and the actual packet loss are below the threshold packet loss, automatically stopping forward error correction for the FEC-configured application.

4. The method of claim 3, further comprising:
   in response to determining the FEC-configured application is manually configured for forward error correction when the predicted packet loss for the FEC-configured application is below the threshold packet loss while the actual packet loss for the FEC-configured application is above the threshold packet loss, starting forward error correction for the FEC-configured application.

5. The method of claim 4, wherein
   in response to determining the actual packet loss for the FEC-configured application is below the threshold packet loss, stopping forward error correction for the manually configured FEC-configured application and an auto-configured FEC-configured application.

6. The method of claim 1, further comprising:
   predicting a network bandwidth available for the FEC-configured application.

7. The method claim 6, wherein
   in response to determining the predicted network bandwidth is below a threshold network bandwidth, automatically stopping forward error correction for the FEC-configured application.

8. The method of claim 7, wherein
   in response to determining the FEC-configured application is manually configured for forward error correction, starting forward error correction for the FEC-configured application.

9. The method of claim 1, further comprising:
   prior to predicting a packet loss for the FEC-configured application during a prescribed interval, classifying an application as the FEC-configured application requiring configuration for automatically starting forward error correction.

10. The method of claim 9, wherein
classifying the application as the FEC-configured application includes classifying the application as a critical application for which forward error correction is required for accounting for packet loss.

11. The method of claim 10, wherein
classifying the FEC-configured application is a critical application includes providing a criticality score for the FEC-configured application; and
classifying the FEC-configured application as a critical application in response to determining the criticality score meets a threshold criticality level.

12. A system comprising:
an analytics service operative
   to classify an application as a critical application for configuration as an FEC-configured application;
   to determine a threshold packet loss at which forward error correction is triggered for the FEC-configured application;
   to predict a packet loss for the FEC-configured application during a prescribed interval;
   to predict a bandwidth consumption associated with the FEC-configured application;
an FEC management component operative
   to monitor a packet loss for the FEC-configured application; and
   to automatically start forward error correction for the FEC-configured application in response to determining a predicted packet loss for the FEC-configured application is above the threshold packet loss and actual packet loss for the FEC-configured application; and
   to automatically stop forward error correction for the FEC-configured application in response to determining the actual packet loss for the FEC-configured application is below the threshold packet loss or in response to determining available bandwidth is below a threshold bandwidth level.

13. The system of claim 12, wherein
the FEC management component is further operative to stop forward error correction for the FEC-configured application after a prescribed interval during which actual packet loss for the FEC-configured application is below the threshold packet loss in response to determining the actual packet loss for the FEC-configured application is below the threshold packet loss while the predicted packet loss is above the threshold packet loss.

14. The system of claim 12, wherein
the FEC management component is further operative to automatically stop forward error correction for the FEC-configured application in response to determining the predicted packet loss for the FEC-configured application and the actual packet loss for the FEC-configured application are below the threshold packet loss.

15. The system of claim 14, wherein
the FEC management component is further operative to start forward error correction for the FEC-configured application in response to determining the FEC-configured application is manually configured for forward error correction when the predicted packet loss for the FEC-configured application is below the threshold packet loss while the actual packet loss for the FEC-configured application is above the threshold packet loss.

16. The system of claim 15, wherein
the FEC management component is further operative to stop forward error correction for the manually configured FEC-configured application in response to determining the actual packet loss for the FEC-configured application is below the threshold packet loss for a prescribed time interval.

17. The system of claim 12, wherein
the analytics service is further operative to predict a network bandwidth available for the FEC-configured application; and
the FEC management component is further operative to stop forward error correction for the FEC-configured application after a prescribed interval during which no packet loss occurs or in response to determining the predicted network bandwidth is below a threshold network bandwidth.

18. A device comprising:
one or more processors; and
one or more non-transitory computer-readable media storing computer-executable instructions that, when executed by the one or more processors, cause the one or more processors to perform operations comprising:
determining a threshold packet loss at which forward error correction is triggered;
predicting a packet loss for a FEC-configured application during a prescribed interval;
monitoring a packet loss for the FEC-configured application; and
in response to determining a predicted packet loss for the FEC-configured application is above the threshold packet loss and actual packet loss for the FEC-configured application is above the threshold packet loss, automatically starting forward error correction for the FEC-configured application.

19. The device of claim 18, further comprising:
predicting a network bandwidth available for the FEC-configured application; and
in response to determining the predicted network bandwidth is below a threshold network bandwidth, stopping forward error correction for the FEC-configured application or after a prescribed interval during which no packet loss occurs.

20. The device of claim 18, wherein
in response to determining the actual packet loss for the FEC-configured application is below the threshold packet loss while the predicted packet loss is above the threshold packet loss, stopping forward error correction for the FEC-configured application after a prescribed interval during which actual packet loss for the FEC-configured application is below the threshold packet loss;
in response to determining the predicted packet loss for the FEC-configured application and the actual packet loss are below the threshold packet loss, automatically stopping forward error correction for the FEC-configured application; and
in response to determining the FEC-configured application is manually configured for forward error correction when the predicted packet loss for the FEC-configured application is below the threshold packet loss while the actual packet loss for the FEC-configured application is above the threshold packet loss, starting forward error correction for the FEC-configured application.

* * * * *